US008593959B2

(12) United States Patent
Hepworth et al.

(10) Patent No.: US 8,593,959 B2
(45) Date of Patent: Nov. 26, 2013

(54) VOIP ENDPOINT CALL ADMISSION

(75) Inventors: Neil Hepworth, Artarmon (AU); Alex M. Krumm-Heller, Gladesville (AU); Stephane C. Laveau, Glebe (AU)

(73) Assignee: Avaya Inc., Basking Ridge, NJ (US)

( * ) Notice: Subject to any disclaimer, the term of this patent is extended or adjusted under 35 U.S.C. 154(b) by 1292 days.

(21) Appl. No.: 11/672,183

(22) Filed: Feb. 7, 2007

(65) Prior Publication Data

US 2007/0133403 A1 Jun. 14, 2007

Related U.S. Application Data

(62) Division of application No. 10/262,005, filed on Sep. 30, 2002.

(51) Int. Cl.
*H04L 12/26* (2006.01)
*H04L 12/28* (2006.01)
*G01R 31/08* (2006.01)

(52) U.S. Cl.
USPC ........................... 370/231; 370/229; 370/401

(58) Field of Classification Search
USPC ............... 370/229, 329, 236, 468, 231, 401; 709/225, 230, 219
See application file for complete search history.

(56) References Cited

U.S. PATENT DOCUMENTS

| | | |
|---|---|---|
| 4,791,660 A | 12/1988 | Oye et al. |
| 5,067,127 A | 11/1991 | Ochiai |
| 5,206,903 A | 4/1993 | Kohler et al. |
| 5,506,872 A | 4/1996 | Mohler |
| 5,594,740 A | 1/1997 | LaDue .......................... 455/410 |
| 5,604,786 A | 2/1997 | Engelke et al. |
| 5,724,405 A | 3/1998 | Engelke et al. |
| 5,724,416 A | 3/1998 | Foladare et al. |
| 5,802,058 A | 9/1998 | Harris et al. |
| 5,828,747 A | 10/1998 | Fisher et al. |
| 5,878,029 A * | 3/1999 | Hasegawa et al. ............ 370/236 |
| 5,905,793 A | 5/1999 | Flockhart et al. |
| 5,933,425 A | 8/1999 | Iwata |
| 5,946,618 A | 8/1999 | Agre et al. ..................... 455/428 |
| 5,953,312 A | 9/1999 | Crawley et al. |
| 5,961,572 A | 10/1999 | Craport et al. ................. 701/207 |

(Continued)

FOREIGN PATENT DOCUMENTS

| | | |
|---|---|---|
| CA | 2319655 | 6/2001 |
| EP | 0982920 | 3/2000 |

(Continued)

OTHER PUBLICATIONS

Application Note, Emergency 911 in Packet Networks, http:www.fastcomm.com/NewWeb/solutions/e911.html, Sep. 5, 2001, FastComm Communications Corporation,3 pgs.

(Continued)

*Primary Examiner* — Mark Rinehart
*Assistant Examiner* — Gbemileke Onamuti
(74) *Attorney, Agent, or Firm* — Sheridan Ross P.C.

(57) ABSTRACT

The present invention is directed generally to an intelligent endpoint or communication device that can collect available bandwidth-related information metrics and/or perform call admission control functions. The present invention is further directed to an architecture comprising a switch or media server in communication with a plurality of subscriber communication devices in which the subscriber communication devices act as network nodes to collect available bandwidth-related information.

13 Claims, 5 Drawing Sheets

(56) References Cited

U.S. PATENT DOCUMENTS

| | | | |
|---|---|---|---|
| 5,982,873 A | 11/1999 | Flockhart et al. | |
| 6,002,933 A | 12/1999 | Bender et al. | |
| 6,021,178 A | 2/2000 | Locke et al. | |
| 6,038,214 A | 3/2000 | Shionozaki | |
| 6,058,163 A | 5/2000 | Pattison et al. | |
| 6,061,431 A | 5/2000 | Knappe et al. | |
| 6,067,300 A | 5/2000 | Baumert et al. | |
| 6,073,013 A | 6/2000 | Agre et al. | 455/428 |
| 6,088,732 A | 7/2000 | Smith et al. | |
| 6,122,665 A | 9/2000 | Bar et al. | |
| 6,163,607 A | 12/2000 | Bogart et al. | |
| 6,173,053 B1 | 1/2001 | Bogart et al. | |
| 6,185,527 B1 | 2/2001 | Petkovic et al. | |
| 6,192,122 B1 | 2/2001 | Flockhart et al. | |
| 6,212,275 B1 | 4/2001 | Akhteruzzaman | |
| 6,249,757 B1 | 6/2001 | Cason | |
| 6,256,300 B1 | 7/2001 | Ahmed et al. | |
| 6,349,136 B1 | 2/2002 | Light et al. | |
| 6,374,302 B1 | 4/2002 | Galasso et al. | |
| 6,381,472 B1 | 4/2002 | LaMedica, Jr. et al. | |
| 6,381,639 B1 | 4/2002 | Thebaut et al. | 709/222 |
| 6,421,425 B1 | 7/2002 | Bossi et al. | |
| 6,434,628 B1 | 8/2002 | Bowman-Amuah | |
| 6,453,022 B1 | 9/2002 | Weinman, Jr. | |
| 6,463,470 B1 | 10/2002 | Mohaban et al. | |
| 6,463,474 B1 | 10/2002 | Fuh et al. | |
| 6,469,991 B1 | 10/2002 | Chuah | |
| 6,490,343 B2 | 12/2002 | Smith, Jr. et al. | |
| 6,490,556 B1 | 12/2002 | Graumann et al. | |
| 6,498,791 B2 | 12/2002 | Pickett et al. | |
| 6,502,131 B1 | 12/2002 | Vaid et al. | |
| 6,526,140 B1 | 2/2003 | Marchok et al. | |
| 6,529,475 B1 | 3/2003 | Wan et al. | |
| 6,529,499 B1 | 3/2003 | Doshi et al. | |
| 6,532,241 B1 | 3/2003 | Ferguson et al. | |
| 6,546,082 B1 | 4/2003 | Alcendor et al. | |
| 6,563,794 B1* | 5/2003 | Takashima et al. | 370/236 |
| 6,578,077 B1 | 6/2003 | Rakoshitz et al. | |
| 6,601,101 B1 | 7/2003 | Lee et al. | |
| 6,618,368 B1 | 9/2003 | Tanigawa et al. | |
| 6,628,611 B1* | 9/2003 | Mochizuki | 370/229 |
| 6,647,270 B1 | 11/2003 | Himmelstein | |
| 6,665,637 B2 | 12/2003 | Bruhn | |
| 6,668,042 B2 | 12/2003 | Michaelis | |
| 6,678,250 B1 | 1/2004 | Grabelsky et al. | |
| 6,724,862 B1 | 4/2004 | Shaffer et al. | |
| 6,725,128 B2 | 4/2004 | Hogg et al. | |
| 6,727,767 B2 | 4/2004 | Takada | |
| 6,754,710 B1 | 6/2004 | McAlear | |
| 6,760,312 B1 | 7/2004 | Hitzeman | |
| 6,760,774 B1 | 7/2004 | Soumiya et al. | |
| 6,765,905 B2 | 7/2004 | Gross et al. | |
| 6,778,534 B1 | 8/2004 | Tal et al. | |
| 6,792,092 B1 | 9/2004 | Michalewicz | |
| 6,798,751 B1 | 9/2004 | Voit et al. | |
| 6,798,786 B1* | 9/2004 | Lo et al. | 370/468 |
| 6,807,564 B1 | 10/2004 | Zellner et al. | |
| 6,857,020 B1 | 2/2005 | Chaar et al. | |
| 6,914,964 B1 | 7/2005 | Levine | |
| 6,954,435 B2 | 10/2005 | Billhartz et al. | |
| 6,964,023 B2 | 11/2005 | Maes et al. | |
| 6,973,033 B1 | 12/2005 | Chiu et al. | |
| 6,980,516 B1 | 12/2005 | Wibowo et al. | |
| 6,988,133 B1 | 1/2006 | Zavalkovsky et al. | |
| 7,003,462 B2 | 2/2006 | Shambaugh et al. | |
| 7,003,574 B1 | 2/2006 | Bahl | |
| 7,010,097 B2 | 3/2006 | Zellner et al. | |
| 7,010,581 B2 | 3/2006 | Brown et al. | |
| 7,031,311 B2 | 4/2006 | MeLampy et al. | |
| 7,031,327 B2 | 4/2006 | Lu | |
| 7,043,435 B2 | 5/2006 | Knott et al. | |
| 7,046,646 B2 | 5/2006 | Kilgore | |
| 7,075,922 B2 | 7/2006 | Mussman et al. | |
| 7,076,540 B2 | 7/2006 | Kurose et al. | |
| 7,076,568 B2 | 7/2006 | Philbrick et al. | |
| 7,089,189 B2 | 8/2006 | Lipe et al. | |
| 7,099,440 B2 | 8/2006 | Michaelis | |
| 7,103,542 B2 | 9/2006 | Doyle | |
| 7,124,205 B2 | 10/2006 | Craft et al. | |
| 7,165,035 B2 | 1/2007 | Zinser et al. | |
| 7,170,855 B1 | 1/2007 | Mo et al. | |
| 7,170,977 B2 | 1/2007 | Doherty et al. | |
| 7,212,969 B1 | 5/2007 | Bennett | |
| 7,221,660 B1 | 5/2007 | Simonson et al. | |
| 7,249,024 B2 | 7/2007 | Engstrom | |
| 7,251,640 B2 | 7/2007 | Baumard | |
| 7,257,120 B2 | 8/2007 | Saunders et al. | |
| 7,260,439 B2 | 8/2007 | Foote et al. | |
| 7,266,499 B2 | 9/2007 | Surace et al. | |
| 7,269,252 B2 | 9/2007 | Eran | |
| 7,272,563 B2 | 9/2007 | Nelson | |
| 7,290,059 B2 | 10/2007 | Yadav | |
| 7,295,555 B2 | 11/2007 | Elzur | |
| 7,299,185 B2 | 11/2007 | Falcon et al. | |
| 7,319,961 B2 | 1/2008 | Al-Dhubaib et al. | |
| 7,321,591 B2 | 1/2008 | Daniel et al. | |
| 7,349,851 B2 | 3/2008 | Zuberec et al. | |
| 7,359,979 B2 | 4/2008 | Gentle et al. | |
| 7,362,745 B1 | 4/2008 | Cope et al. | |
| 7,363,371 B2 | 4/2008 | Kirkby et al. | |
| 7,376,564 B2 | 5/2008 | Selg et al. | |
| 7,398,212 B2 | 7/2008 | Yacoub | |
| 7,437,297 B2 | 10/2008 | Chaar et al. | |
| 7,454,351 B2 | 11/2008 | Jeschke et al. | |
| 7,474,627 B2 | 1/2009 | Chheda et al. | |
| 7,496,661 B1 | 2/2009 | Morford et al. | |
| 7,502,741 B2 | 3/2009 | Finke et al. | |
| 7,509,260 B2 | 3/2009 | Cross, Jr. et al. | |
| 7,519,536 B2 | 4/2009 | Maes et al. | |
| 7,565,415 B1* | 7/2009 | Markowitz et al. | 709/219 |
| 2001/0012993 A1 | 8/2001 | Attimont et al. | |
| 2001/0036157 A1 | 11/2001 | Blanc et al. | |
| 2001/0039210 A1 | 11/2001 | St-Denis | 463/42 |
| 2002/0073232 A1 | 6/2002 | Hong et al. | |
| 2002/0080808 A1 | 6/2002 | Leung | |
| 2002/0085703 A1 | 7/2002 | Proctor | |
| 2002/0091843 A1 | 7/2002 | Vaid | |
| 2002/0105911 A1 | 8/2002 | Pruthi et al. | |
| 2002/0116522 A1 | 8/2002 | Zelig | |
| 2002/0143971 A1 | 10/2002 | Govindarajan et al. | |
| 2002/0152319 A1 | 10/2002 | Amin et al. | |
| 2002/0176404 A1 | 11/2002 | Girard | |
| 2003/0002650 A1 | 1/2003 | Gruchala | |
| 2003/0016653 A1 | 1/2003 | Davis | |
| 2003/0016876 A1 | 1/2003 | Chai et al. | |
| 2003/0086515 A1 | 5/2003 | Trans et al. | |
| 2003/0120789 A1 | 6/2003 | Hepworth et al. | |
| 2003/0185217 A1 | 10/2003 | Ganti et al. | |
| 2003/0223431 A1 | 12/2003 | Chavez et al. | |
| 2003/0227878 A1 | 12/2003 | Krumm-Heller et al. | 370/254 |
| 2004/0073641 A1 | 4/2004 | Minhazuddin et al. | |
| 2004/0073690 A1* | 4/2004 | Hepworth et al. | 709/230 |
| 2005/0064899 A1 | 3/2005 | Angelopoulos et al. | |
| 2005/0119892 A1 | 6/2005 | Agapi et al. | |
| 2005/0119894 A1 | 6/2005 | Cutler et al. | |
| 2005/0125229 A1 | 6/2005 | Kurzweil | |
| 2005/0125230 A1 | 6/2005 | Haas | |
| 2005/0131697 A1 | 6/2005 | Brown et al. | |
| 2005/0131698 A1 | 6/2005 | Tischer | |
| 2005/0131699 A1 | 6/2005 | Fukada | |
| 2005/0131700 A1 | 6/2005 | Washburn et al. | |
| 2005/0154590 A1 | 7/2005 | Coffey et al. | |
| 2005/0177370 A1 | 8/2005 | Hwang et al. | |
| 2005/0180323 A1 | 8/2005 | Beightol et al. | |
| 2005/0186933 A1 | 8/2005 | Trans | |
| 2005/0192808 A1 | 9/2005 | Sugiyama | |
| 2005/0203746 A1 | 9/2005 | Obata | |
| 2005/0216268 A1 | 9/2005 | Kannappan | |
| 2005/0228673 A1 | 10/2005 | Nefian et al. | |
| 2005/0228674 A1 | 10/2005 | Gunn et al. | |
| 2005/0228675 A1 | 10/2005 | Trinkel et al. | |
| 2005/0240409 A1 | 10/2005 | Gallistel | |
| 2005/0240410 A1 | 10/2005 | Charles et al. | |
| 2005/0240412 A1 | 10/2005 | Fujita | |

(56) References Cited

U.S. PATENT DOCUMENTS

| | | |
|---|---|---|
| 2005/0240413 A1 | 10/2005 | Asano et al. |
| 2005/0246173 A1 | 11/2005 | Creamer et al. |
| 2005/0246174 A1 | 11/2005 | DeGolia |
| 2005/0256717 A1 | 11/2005 | Miyata et al. |
| 2005/0261035 A1 | 11/2005 | Groskreutz et al. |
| 2005/0261907 A1 | 11/2005 | Smolenski et al. |
| 2005/0273339 A1 | 12/2005 | Chaudhari et al. |
| 2005/0278148 A1 | 12/2005 | Bader et al. |
| 2005/0278177 A1 | 12/2005 | Gottesman |
| 2005/0278178 A1 | 12/2005 | Girouard et al. |
| 2005/0283366 A1 | 12/2005 | Lee |
| 2005/0283367 A1 | 12/2005 | Ativanichayaphong et al. |
| 2005/0283368 A1 | 12/2005 | Leung |
| 2005/0288933 A1 | 12/2005 | Nakamura et al. |
| 2005/0288934 A1 | 12/2005 | Omi |
| 2005/0288935 A1 | 12/2005 | Lee et al. |
| 2006/0004579 A1 | 1/2006 | Claudatos et al. |
| 2006/0009979 A1 | 1/2006 | McHale et al. |
| 2006/0009980 A1 | 1/2006 | Burke et al. |
| 2006/0020468 A1 | 1/2006 | Hilliard |
| 2006/0020469 A1 | 1/2006 | Rast |
| 2006/0031073 A1 | 2/2006 | Anglin et al. |
| 2006/0036440 A1 | 2/2006 | Kunkel |
| 2006/0047515 A1 | 3/2006 | Connors |
| 2006/0067486 A1 | 3/2006 | Zellner et al. |
| 2006/0069568 A1 | 3/2006 | Passaretti et al. |
| 2006/0069570 A1 | 3/2006 | Allison et al. |
| 2006/0069779 A1* | 3/2006 | Sundqvist et al. ............ 709/225 |
| 2006/0074679 A1 | 4/2006 | Pifer et al. |
| 2006/0074681 A1 | 4/2006 | Janiszewski et al. |
| 2006/0074682 A1 | 4/2006 | Chou et al. |
| 2006/0080103 A1 | 4/2006 | Van Breemen |
| 2006/0080104 A1 | 4/2006 | Dang |
| 2006/0100879 A1 | 5/2006 | Jakobsen et al. |
| 2006/0100880 A1 | 5/2006 | Yamamoto et al. |
| 2006/0100881 A1 | 5/2006 | He |
| 2006/0100882 A1 | 5/2006 | Eves et al. |
| 2006/0100883 A1 | 5/2006 | Miyamoto et al. |
| 2006/0106610 A1 | 5/2006 | Napper |
| 2006/0106611 A1 | 5/2006 | Krasikov et al. |
| 2006/0106613 A1 | 5/2006 | Mills |
| 2006/0116880 A1 | 6/2006 | Gober |
| 2006/0116881 A1 | 6/2006 | Umezawa et al. |
| 2006/0129405 A1 | 6/2006 | Elfanbaum |
| 2006/0136217 A1 | 6/2006 | Mullin |
| 2006/0143014 A1 | 6/2006 | Cheng et al. |
| 2006/0143015 A1 | 6/2006 | Knott et al. |
| 2006/0161440 A1 | 7/2006 | Nakayama et al. |
| 2006/0167694 A1 | 7/2006 | Mitsuyoshi |
| 2006/0167695 A1 | 7/2006 | Spille et al. |
| 2006/0173688 A1 | 8/2006 | Whitham |
| 2006/0190262 A1 | 8/2006 | Roskind |
| 2006/0195322 A1 | 8/2006 | Broussard et al. |
| 2006/0217985 A1 | 9/2006 | Noguchi et al. |
| 2006/0235693 A1 | 10/2006 | Ruderman et al. |
| 2006/0247931 A1 | 11/2006 | Caskey et al. |
| 2006/0247932 A1 | 11/2006 | Yamamoto |
| 2007/0103317 A1 | 5/2007 | Zellner et al. |
| 2007/0168195 A1 | 7/2007 | Wilkin et al. |
| 2007/0172083 A1 | 7/2007 | Tseng et al. |
| 2008/0117869 A1* | 5/2008 | Freen et al. .................... 370/329 |
| 2008/0151886 A1 | 6/2008 | Gentle et al. |
| 2008/0151898 A1 | 6/2008 | Gentle et al. |
| 2008/0151921 A1 | 6/2008 | Gentle et al. |

FOREIGN PATENT DOCUMENTS

| | | | |
|---|---|---|---|
| EP | 1549035 | 6/2005 | |
| WO | WO 91/14278 | 9/1991 | ............ H01H 67/00 |
| WO | WO 98/46035 | 10/1998 | ............ H04Q 7/12 |
| WO | WO 99/51038 | 10/1999 | |
| WO | WO 00/41090 | 7/2000 | ............ G06F 15/16 |
| WO | WO 00/72563 | 11/2000 | |
| WO | WO 01/26393 | 4/2001 | ............ H04Q 7/20 |
| WO | WO 01/75705 | 10/2001 | ............ G06F 17/60 |
| WO | WO 02/00316 | 1/2002 | ............ A63F 9/24 |

OTHER PUBLICATIONS

Baker (Editor), "Requirements for IP Version 4 Routers", RFC 1812, Jun. 1995, 175 pages.

Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Int'l. Symposium on Multimedia Software Engineering, Dec. 2000.

Bernet et al., "Specification of the Null Service Type", RFC997, Nov. 2000, 12 pages.

Bernet, "Format of the RSVP DCLASS Object", RFC 2996, Nov. 2000, 9 pgs.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, I. Internet Engineering Task Force, Securing Prioritised Emergency Traffic, http://www.iepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco IP Phone 7960, eLearning Tutorial, at www.cisco.com/warp/public/779/largeent/avvid/products/7960/7960_show_using_help.htm.

Cisco Systems, "Cisco Emergency Responder Version 1.1 Data Sheet" (Oct. 2001), 5 pages, copyright 1992-2001.

Ejaz Mahfuz; "Packet Loss Concealment for Voice Transmission Over IP Networks" (2001) (Master thesis, Department of Electrical Engineering, McGill University) (on file with author).

Floyd et al., "Random Early Detection Gateways for Congestion Avoidance", IEEE/ACM Transaction on Networking, Aug. 1993, 22 pages.

Geeta Desai Chennubhotla, "Embedded Systems: Rough start, but voice market growing," EE Times, at http://www.eetimes.com/in_focus/embedded_systems/E0G2002050330067 (May 6, 2002).

Getting Started with the Cisco IP Phone 7960/7940, pp. 3-1 to 3-2.

Government Emergency Telecommunications Service (GETS), "White Paper on IP Telephony a Roadmap to Supporting GETS in IP Networks," Apr. 27, 2000, Science Applications International Corporation, pp. 1-32.

Grigonis, Computer Telephony Encyclopedia, pp. 268-277, 2000.

Handley et al., "SIP: Session Initiation Protocol", RFC 2543, Mar. 1999, 81 pages.

Herzog et al., "COPS Usage for RSVP", RFC 2749, Jan. 2000, 16 pages.

Huai-Rong Shao et al., "A New Framwork for Adaptive Multimedia over the Next Generation Internet," Microsoft Research China.

IEEE Standards for Information Technology—Telecommunications and information exchange between systems—Local and metropolitan area networks—Common specifications—Part 3: Media Access Control (MAC) Bridges, LCN/MAN Standards Committee of the IEEE Computer Society, ANSI/IEEE Std 802.1D (1998).

IEEE Standards for Local and Metropolitan Area Networks: Virtual Bridged Local Area Networks, The Institute of Electrical and Electronics engineers, IEEE Std 802.1Q-1998 (Mar. 8, 1999).

International Engineering Consortium, "Silence Suppression and Comfort Noise Generation" at http:/www.iec.org/online/tutorials/voice_qual/topic07.html (Jul. 1, 2002).

International Emergency Preference Scheme (IEPS), http://www.iepscheme.net/, Jun. 16, 2000, pp. 1-2.

International Teleco9mmunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).

(56) References Cited

OTHER PUBLICATIONS

Itu, "Packet-based multimedia communications systems", H. 323, Feb. 1998, 125 pages.
J. Heinanen et al., "Assured Forwarding PHB Group," Network Working Group, Category: Standards Track (Jun. 1999).
Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.
K. Nichols, Cisco Systems, RFC 2474, Definition of Differentiated Services Field in IPv4 & IPv6 Headers, Dec. 1998.
McCloghrie et al., "Structure of Policy Provisioning Information (SPPI)", RFC 3159, Aug. 2001, 36 pages.
PacketCableTM Dynamic Quality-of-Service Specification PKT-SP-DQOS-102-000818, 2000, Cable Television Laboratories, Inc., 211 pages.
Paul Roller Michaelis, "Speech Digitization and Compression", Int'l Encyclopedia of Ergonomic and Human Factors (W. Warkowski ed., Taylor & Francis 2001).
PacketCable, Cable Labs http.//www.packetcable.com, copyright 2000-20021.
"Packet Loss and Packet Loss Concealment Technical Brief," Nortel Netowks at http://www.nortelnetworks.com (2000).
Peter Parnes, "Real-time Transfer Protocol (RTP)" (Sep. 8, 1997), at www.cdt.luth.se/~peppar/docs/lic/html/nodel68.html.
S. Blake et al., "An Architecture for Differentiated Services," Network Working Group, Category: Informational (Dec. 1998).
Sangeun Han et al., "Transmitting Scalable Video over a DiffServ network," EE368C Project Proposal (Jan. 30, 2001).
Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.
TechTarget, "voice activation detection," at http://searchnetworking.te...m/sDefinition/O,,sid7_gci342486.00.html (Jul. 1, 2002).
"Telogy Networks'Voice Over Packet White Paper," Telopy Networks, Inc., available at http://www.telpgy.com/our_products/golden_gateway/VOPwhite.html (Han. 1998).
V. Jacobsen et al., "An Expedited Forwarding PHB," Network Working Group, Category: Standards Track (Jun. 1999).
"Voice over packet: An assessment of voice performance on packet networks white paper," Nortel Networks, Publication No. 74007.25/09-01, at http://www.nortelnetworks.com (2001).
Wroclawski, "The use of RSVP with IETF Integrated Services", RFC 2210, Sep. 1997, 31 pages.
"Access for 9-1-1 and Telephone Emergency Services," American with Disabilities Act, U.S. Department of Justice (Jul. 15, 1998), available at http://www.usdoj.gov/crt/ada/911ta.htm, 11 pages.
Le Boudec, Jean-Yves et al., slideshow entitled "Quality of Service in IP Networks (2)," Queue Management (undated), pp. 1-30.
RADVision, "SIP: Protocol Overview," (2001), pp. 1-16.
Schulzrinne, "Emergency Call Services for SIP-based Internet Telephony," Internet Engineering Task Force (Mar. 25, 2001), pp. 1-17.
Official Action for U.S. Appl. No. 10/262,005, mailed Nov. 12, 2008.
Official Action for U.S. Appl. No. 10/262,005, mailed May 2, 2008.
Official Action for U.S. Appl. No. 10/262,005, mailed Sep. 24, 2007.
Official Action for U.S. Appl. No. 10/262,005, mailed Apr. 6, 2007.
Official Action for U.S. Appl. No. 10/262,005, mailed Jul. 17, 2006.
Official Action for U.S. Appl. No. 10/262,005, mailed Dec. 16, 2005.
U.S. Appl. No. 12/240,119, filed Sep. 29, 2008, Hepworth et al.
U.S. Appl. No. 12/133,533, filed Jun. 5, 2008, Kloberdans et al.
U.S. Appl. No. 10/882,975, filed Jun. 30, 2004, Becker et al.
U.S. Appl. No. 11/671,733, filed Feb. 6, 2007, Beck et al.
3COM, 3Com IP Conferencing and Presence Modules, Dec. 2006, pp. 1-2, http://www.3com.com/other/pdfs/products/en_US/3com_400867.pdf.
Chelston Call Systems, How Audio Conferencing Can Benefit Your Organisation, Jan. 2, 2008, pp. 1-3, http://www.chelston.co.uk/Welcome/Pages/Products/Audio-Conferencing.htm.
Ditech Networks, Conferencing Voice Quality and Echo Cancellation, (undated) (printed Jan. 2, 2008), pp. 1-4, http:/www.ditechcom.com/solutions/solutionsdetail.aspx?pid=44.
Global IP Solutions, Backgrounder, (undated) (printed Jan. 2, 2008), pp. 2-6, http://www.gipscorp.com/default/backgrounder.html.
Indosoft Inc., Teleconferencing Bridge Features, 2005, pp. 1-6, http:/www.indosoft.ca/features.htm.
Iwatsu Voice Networks, News: Iwatsu Announces the Release of the IX-CNFBOX-1 Eight-Party Conference Bridge for ADIX, Feb. 26, 1998, pp. 1, http://ivoicenetworks.com/News/pr-cfnb.html.
NEC America, Conference Bridge Solution for the Electrak Elite IPK/IPK II, Jan. 2006, pp. 1-2, available at http://www.necunifiedsolutions.com/Downloads/PDFs/790304_EE_IPK_II_ConfBridge.pdf.
NEC Infrontia Inc., Aspire Conference Bridge data Sheet, 2007, pp. 1-2, http://www.necaspire.com/necaspire/conference_bridge/conference_bridge.php.
Newly-released feature and enhancement highlights of "Avaya MultiVantage Software"; Release 1.2, Jan. 2003; 9 pages.
Polycom Inc., Polycom VoicePlus, Full featured PSTN and VoIP conferencing, 2003, pp. 1-2, available at http://www.ccpin.com/pdf/Polycom/VoicePlus.pdf.
Skype Journal, High Definition Voice: Bringing Skype's high Bandwidth Audio to Conference Calls, Oct. 23, 2007, pp. 1-5, http://skypejournal.com/blog/2007/10/high_definition_voice_bringing.html.
Squelch from Wikipedia; printed from Internet at: http://en.wikipedia.org/w/index.php?title=Squelch&printable=yes; 4 pages.
Thomasnet, ShoreTel Extends Portfolio of Collaboration Solutions with SIP-Enabled ShoreTel IP 8000 Conference Phone, Jul. 17, 2007, pp. 1-2, http://news.thomasnet.com/printready.html?prid=525606.
TMCNET, Aastra selects Octasic OCT6100 device for CNX Conference Bridge Appliance, Mar. 8, 2005, pp. 1-2, http://www.tmcnet.com/usubmit/2005/Mar/1123217.htm.
"Using the 79xx Status Information for Troubleshooting" available at http://www.cisco.com/en/US/products/hw/phones/ps379/products_tech_note09186a00800945bd.shtml#display, Updated: Nov. 13, 2006, pp. 1-5.
Official Action for U.S. Appl. No. 10/262,005, mailed Apr. 28, 2009.
Background of the Invention for the above-captioned application (previously provided).

* cited by examiner

VOIP ENDPOINT CALL ADMISSION

CROSS REFERENCE TO RELATED APPLICATIONS

This application is a divisional of U.S. patent application Ser. No. 10/262,005, filed Sep. 30, 2002, to Hepworth, et al., of the same title, which is incorporated herein by this reference.

Cross-reference is made to copending U.S. application Ser. No. 10/028,874, filed Oct. 22, 2001, to Rankine et al., entitled "Real Time Control Protocol Session Matching"; Ser. No. 10/109,784, filed Mar. 29, 2002, to Chavez et al., entitled "Emergency Bandwidth Allocation with an RSVP-Like Protocol"; Ser. No. 10/165,719, filed Jun. 7, 2002, to Krumm-Heller et al., entitled "Apparatus and Method for Automatically and Dynamically Reconfiguring Network Provisioning", and Ser. No. 10/261,914, filed concurrently herewith, to Minhazuddin et al., entitled "Instantaneous User Initiation Voice Quality Feedback", each of which contains related subject matter and is incorporated herein fully by reference.

FIELD OF THE INVENTION

The present invention relates generally to communications over networks and specifically to voice communications over data networks.

BACKGROUND OF THE INVENTION

Distributed processing networks are being increasingly used for live voice communications between network nodes using Voice over IP or VoIP technology. In VOIP technology, after the speech is digitized, the digitized speech is divided into packets. Each packet includes a header and a data payload of one to several frames of encoded speech. Distributed processing networks for delivering the packets to desired endpoints are typically designed to provide a Best Effort or BE single service model that does not discriminate in packet delivery between services and does not control service access or quality. Quality of Service or QoS architectures have been developed for BE environments to provide guaranteed transmission characteristics end-to-end such as available bandwidth, maximum end-to-end delay, maximum end-to-end delay variation (jitter), and packet/cell loss levels to provide continuous data streams suitable for real-time phone calls and video conferencing. Such QoS architectures include protocols such as the Resource ReSerVation Protocol or RSVP and the Real-Time Transfer Protocol or RTP.

RSVP is a signaling protocol that guarantees receivers a requested end-to-end QoS. RSVP serves as an Internet signaling protocol through the transmission of QoS parameters. Under RSVP, an end point negotiates with the network to allocate or reserve protected resources for traffic that the end point will generate or receive. The two messages that perform the reservation request and installation are the Path and Resv messages. Robustness is achieved through maintaining a soft state network by transmitting periodic refresh messages to maintain a reservation and path state along the reservation path. If the intermediate nodes do not receive the refresh message, the reservation will time out and be deleted.

RTP is a voice bearer channel transfer protocol. RTP neither guarantees a QoS nor provides for resource reservations. RTP runs on the transport layer of the Open Systems Interconnection or OSI model and defines a session by two components, namely its profile and payload format where the payload is the data being transmitted. The payload format specifies the format of the data within the RTP packet such as encoding and compression schemes. RTP functions include loss detection for quality estimation and rate adaptation, sequencing of data, intra- and intermedia synchronization, session identification using a session id, source identification using a synchronization source id or SSRC, and basic membership information.

The Real-Time Control Protocol or RTCP, a companion protocol to RTP, is used by applications to monitor the delivery of RTP streams. Media packets are transmitted between endpoints during a session according to RTP while additional performance information governing the communication link (e.g., key statistics about the media packets being sent and received by each end point such as jitter, packet loss, round-trip time, etc.) are collected by the end points and transmitted to a session monitor according to RTCP. The network monitor can be, for example, VoIP Monitoring Manager™ or VMon™ by Avaya, Inc.

Under either the RSVP or RTP protocols, VoIP introduces a whole new range of QoS problems which were not previously significant or, in some cases, even encountered in circuit-switched networks. Voice telephony depends upon reliable, low latency, real-time delivery of audio data. In VoIP, values for latency, packet loss, and jitter can increase substantially, particularly during periods of heavy network traffic, causing a user to experience a much poorer quality of communication (e.g., audio or video distortion, unacceptable levels of asynchronization between audio and video streams, etc.) than would be experienced if the call were made by a traditional circuit-switched telephony network. This is particularly true when the network allows any and all calls to occur, regardless of available bandwidth and the concomitant low quality of the call to be placed and the detrimental impact on the quality of other calls.

To provide a higher QoS, call admission control (CAC) functionality has been employed to control bandwidth usage. In one approach, CAC-type functionality is built into the communication protocol. For example, in RSVP calls are disallowed when a reservation fails. In another approach, CAC functionality is built into the switch or media server (e.g., the Private Branch Exchange or PBX). Under the H.323 standard for example, an endpoint in the H.323 zone of a call admission controller or gatekeeper must receive permission (using a bandwidth request message) from the call admission controller before making a call. Based on a restriction on the number of concurrent IP calls that can be placed generally and/or on a critical measure, such as not being able to reserve the bandwidth required, the call admission controller responds with a bandwidth confirm message permitting the call to be placed or a bandwidth reject message refusing to make the necessary connection for the call. The remaining bandwidth is reserved for electronic mail, file transfers, and other local-area network or LAN protocols.

Although a higher QoS can be realized using CAC functionality, there are drawbacks. First, there is no reason provided to the user regarding the failure to place the call. This can lead to user frustration and ultimately to a lack of utilization of IP telephony. Although some telephones, such as the Cisco IP Phone 7960™, do permit a user to press a button and view the current values for latency, packet loss, and jitter, this feature is only enabled after a call is placed. Second, it can be very difficult for a call admission controller to determine accurately whether or not to place a call. For example, if the controller is in a first subnet, a first endpoint is in a second subnet, and a second endpoint is in a third subnet, the controller is often unable to determine whether or not there is sufficient bandwidth available between the second and third subnets for the first and second endpoints to conduct a communication of acceptable quality. Although the controller can base the decision on pings to the second and third subnets, this is generally not an accurate indicator of available bandwidth. Third, CAC techniques provide the user with no option about placing the call if predefined criteria are not satisfied. There are situations when a user may want to place a call even though the call may be of poor quality. For example, a user may want to place a call in an emergency situation.

SUMMARY OF THE INVENTION

These and other needs are addressed by the various embodiments and configurations of the present invention. The present invention is directed generally to an intelligent endpoint or communication device that can collect bandwidth related metrics and/or perform call admission control functions.

In one embodiment, a method for controlling contact admission is provided. The method includes the steps of:

(a) receiving from a first user at a first endpoint a signal (e.g., a telephone number, an address on a data network, etc.) associated with initiation of a voice communication with a second endpoint;

(b) collecting bandwidth-related metrics or bandwidth information associated with an expected quality of the voice communication by performing one or more of the following:

(i) sending one or more test packets to the second endpoint to obtain a first subset of bandwidth information;

(ii) requesting, from one or more intermediate nodes or network entities in the communication path between the first and second endpoints, a second subset of bandwidth information; and (iii) requesting, from a switch or media server in communication with the first and second endpoints, a third subset of bandwidth information (the third subset of bandwidth information is typically from communications between endpoints other than the first and second endpoints);

(c) comparing some or all of the collected bandwidth information with one or more configurable thresholds;

(d) when the collected bandwidth information fails to satisfy the thresholds, notifying the first user of a likelihood of a low quality of the communication and/or not permitting initiation of the communication between the first and at least a second endpoints; and (e) when the collected bandwidth information satisfies the threshold(s), permitting initiation of the communication between the first and second endpoints.

The first and second endpoints can be any suitable communication device, such as an IP hard phone, an IP softphone, a telephone other than an IP hard phone and softphone, and a personal digital assistant.

The bandwidth information can include one or more of: received RTP packets, received RTP octets, round trip time, jitter buffer delay, jitter, packet loss burst size, a number of out-of-order packets, an out-of-order distance, Reservation Protocol status, call state, sender channel state, IP Differential Service Code Point, available bandwidth, router buffer size, a number of dropped packets by a router, router bandwidth utilization, and router processor utilization.

This embodiment decentralizes the call admission control functionality from the switch/media server to the endpoints serviced by the switch/media server. The endpoint and not the switch/media server is best able to evaluate available bandwidth for the requested communication. For example, this embodiment is particularly beneficial for endpoints in virtual private networks where there is a higher likelihood of call failure due to network constraints which are frequently unknown to the switch/server (e.g., the use of a low speed modem link). This embodiment is also particularly beneficial in evaluating available bandwidth between endpoints in different subnets from the switch/media server. The embodiment can reduce significantly network congestion relative to conventional systems by reducing the numbers of calls placed, particularly during periods of high usage.

Other forms of call admission control assume some kind of administrative load on the routers and the switch/server. This embodiment is extremely lightweight in terms of cost of implementation, e.g., it only affects the endpoints themselves rather than all network entities in a selected path. It also requires minimal administration other than the user enabling the functionality on the endpoint.

The embodiment provides more options to the user to help improve quality for VoIP calls. In a non-mission-critical application, a system that disallows and/or discourages low quality calls may be able to stop overload of a system when the user would exit the call of a certain quality anyway. The thresholds can be configured by network administration and/or by the user himself or herself. User configurable thresholds are particularly attractive as the personal preferences of each user, which vary widely from user to user, can be taken into account by each endpoint. The embodiment can be configured to permit the user to place a call even when the quality will be poor and/or provide detailed reasons for not placing the call, thereby reducing user frustration relative to conventional CAC systems.

In another embodiment, an endpoint or communication device collects bandwidth information during a voice communication and, when the collected bandwidth information fails to satisfy one or more voice quality threshold(s), informs a user that the voice quality is below a selected level.

In current phones, such as the Cisco I-Button™ the user is able to view performance metrics, such as latency and packet loss, by pressing a button on the phone. The user, however, must continually press the button to refresh the metrics and determine when call quality is deteriorating, which can be very detracting during the conversation. In contrast, the communication device of this embodiment itself determines automatically when call quality is deteriorating and warns the user accordingly. This permits the user to wrap up the conversation before voice quality deteriorates to a level that is unacceptable.

In yet another embodiment, method for collecting bandwidth information is provided. In the method, a switch or a media server in communication with a plurality of subscriber communication devices uses the subscriber communication devices as network nodes to collect bandwidth information. In one configuration, the switch or media server progressively collects bandwidth information from each subscriber communication device in the network, e.g., LAN or enterprise network, served by the switch or media server. Any subscriber communication device involved in a communication when requested for bandwidth information is typically skipped.

This embodiment effectively treats the subscriber communication devices as network probes to provide a real-time, complete, and detailed picture of the bandwidth utilization levels across selected parts of the network. The use of existing devices to perform bandwidth information collection is much less expensive and far simpler than installing a myriad of dedicated network probes at various points in the network.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
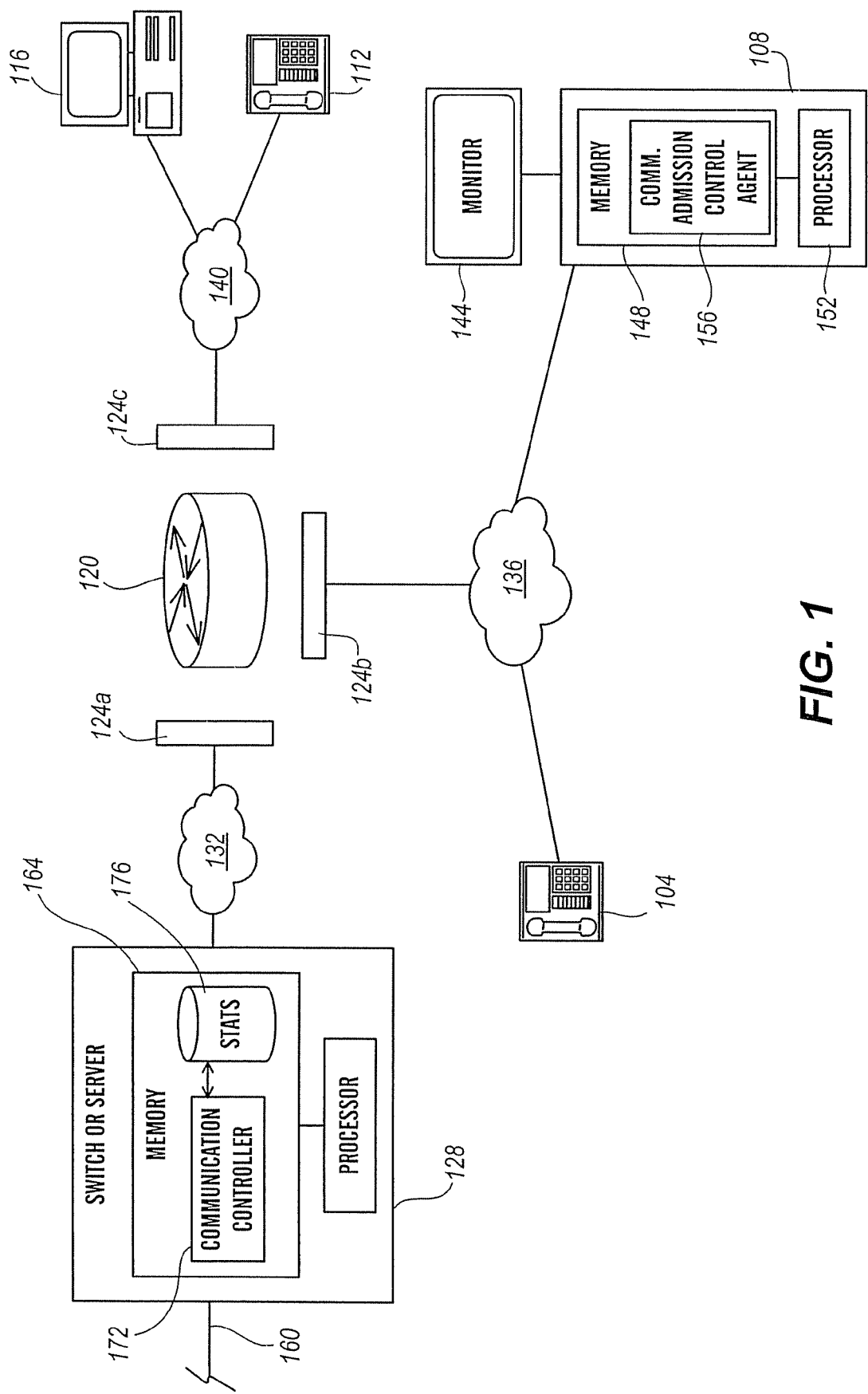
FIG. 1 is a block diagram showing an implementation of a first embodiment of the present invention.

FIG. 1 depicts a VoIP architecture 100 according to an embodiment of the present invention. The architecture includes a first, second, third, and fourth end points 104, 108, 112, and 116, a router 120 having associated interfaces 124a-c, and switch or server 128. The various components are interconnected by first, second, and third subnets 132, 136, and 140, respectively, which collectively form a local area network. For illustration purposes, the first and third endpoints 104 and 112 are configured as IP hard-phones, while the second and third endpoints 108 and 116 are configured as IP soft-phones. As will be appreciated, the various end points can be any communication device, such as a plain old telephone, a soft phone, an IP hard phone, a personal or laptop computer, a PDA, a pager, and a wireless phone. It is further to be understood that the architecture can include any number of subnetworks and routers, depending on the application, and that the subnets can form a network topology other than a LAN, such as a wide-area network, an enterprise network, and a metropolitan-area network.

As depicted, the second end point 108 is a personal computer including a computer display monitor 144 and a computer comprising memory 148 and a processor 152. The memory 148 includes a communication admission control agent 156 to collect session-related information, such as latency, packet loss, jitter, available bandwidth, and jitter buffer delay to be used in determining whether or not a communication or call should be placed. As will be appreciated, the other endpoints preferably include a communication admission control agent as well. Although the various endpoints are shown as subscribers to the switch or server, it is to be understood that one or more of the endpoints can be nonsubscribers.

The switch or media server preferably performs automatic communication routing functions to the various endpoints. The switch or media server 128 is connected to one or more communication lines 160 (e.g., telephone lines or trunks) over which it receives incoming contacts on the public switched telephone network or IP network. As will be appreciated, a "contact" can be any form, mode, or type of single media or multimedia communication, such as a wired or wireless live voice communication (whether circuit-switched or packet-switched), electronic mail, and video conferencing.

The switch or media server 128 can be any architecture for routing contacts to one or more endpoints. Illustratively, the switch or server of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; or Nortel Networks' IPConnect™. The switch or media server typically is a stored-program-controlled system that conventionally includes interfaces to external communication links, a communications switching fabric, service circuits (e.g., tone generators, announcement circuits, etc.), memory 164 for storing control programs and data, and a processor 168 (i.e., a computer) for executing the stored control programs to control the interfaces and the fabric and to provide automatic contact-distribution functionality. Included in the memory 164 is a communication or call controller 172 to supervise the placement of contacts among subscribers, such as the first, second, third, and fourth endpoints, and between a subscriber and a nonsubscriber and a database 176 of performance metrics or bandwidth information collected during communications by subscribers.

The bandwidth information in the memory 164 can vary depending on the application. For each current or historical communication, the database 164 can include one or more of the following: received RTP packets (an integer that is cumulative for the session and is reset to zero at the start of each new RTP session), received RTP octets (an integer that is cumulative for the session and is reset to zero at the start of each new RTP session), round trip time (an integer expressed in units of milliseconds that is reset to zero at the start of each new session), jitter buffer delay (an integer representing the delay imparted on the bearer channel by the jitter buffer at an endpoint and is expressed in milliseconds), jitter (an integer indicating a level of distortion of the interpacket arrival times compared to the interpacket times of the original transmission), packet loss burst size (an integer indicating the maximum number of consecutive packets lost in the last RTCP reporting interval), the number of out-of-order packets (an integer representing the number of packets received out-of-order in the last RTCP reporting interval), the out-of-order distance (an integer representing the number of packets after an out-of-order packet was received from when it was expected to be received), RSVP status (the RSVP status field reports the state of RSVP protection of the receiver end point's RTP session only (e.g., states can include receiver RSVP not in use, receiver RSVP disabled, receiver RSVP installation pending, receiver RSVP reservation failed, and receiver RSVP reservation installed), call state, sender channel state, DCSP (an integer that is the value of the IP Differentiated Service Code Point or DSCP field of the incoming RTP packets), available bandwidth, router buffer size (one or more integers equal to the number of packets enqueued or stacked for processing at the queried interface of the router or the stacking maximum capacity of the buffer at the queried router interface), dropped packets (the dropped packet field (s) comprise at least the following information, whether or not the queried interface of the router is dropping packets and, if so, how many and why (e.g., excessive delay, duplication and/or fragmentation)), router bandwidth utilization (an integer equal to the percent bandwidth utilization at a queried router interface at a selected point in time), and router processor utilization (an integer equal to the percent utilization of the router processor at a selected point in time).

Figure 2:
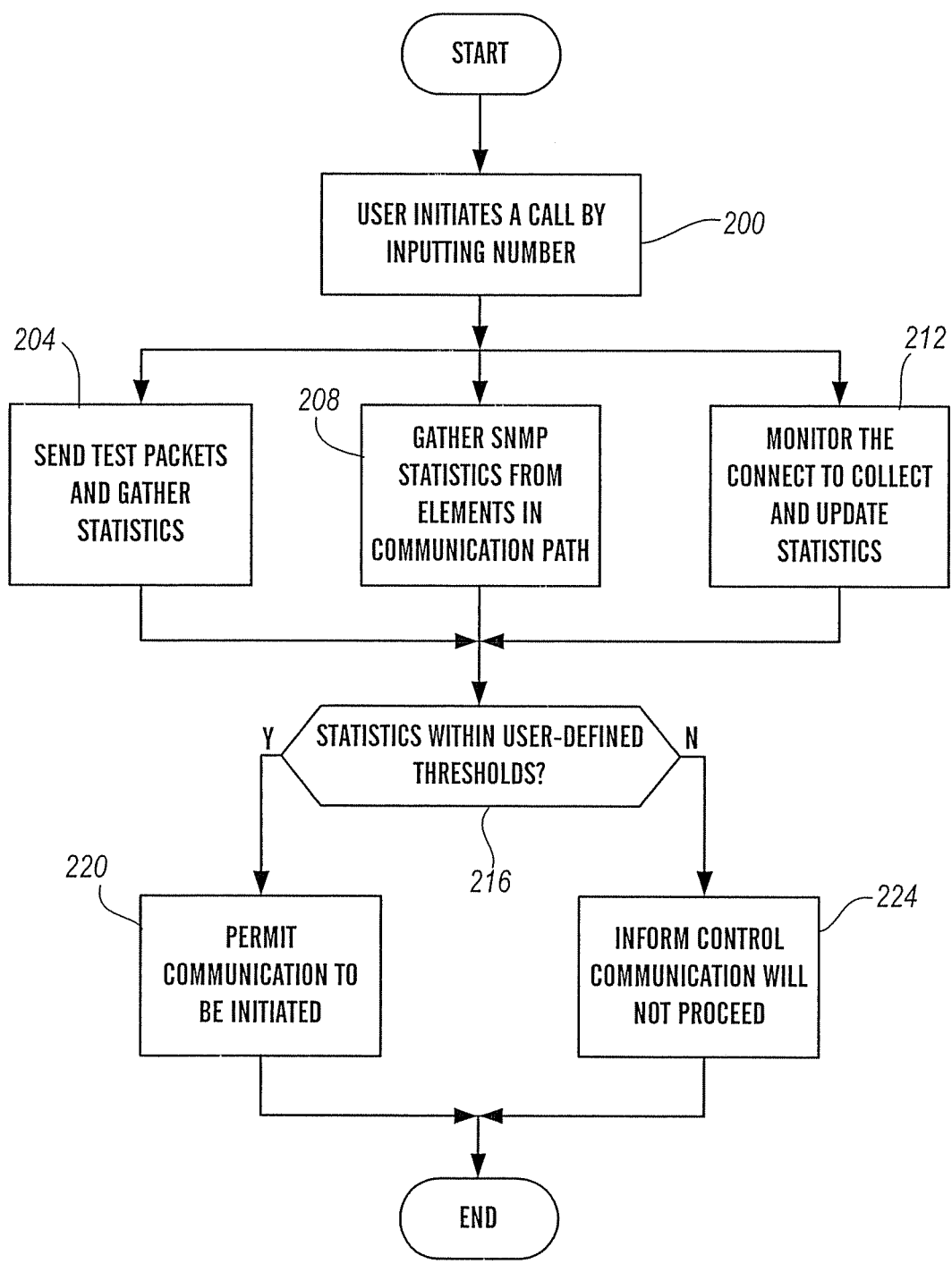
FIG. 2 is a flowchart showing an embodiment of the operation of the communication admission control agent of FIG. 1.
Figure 3:
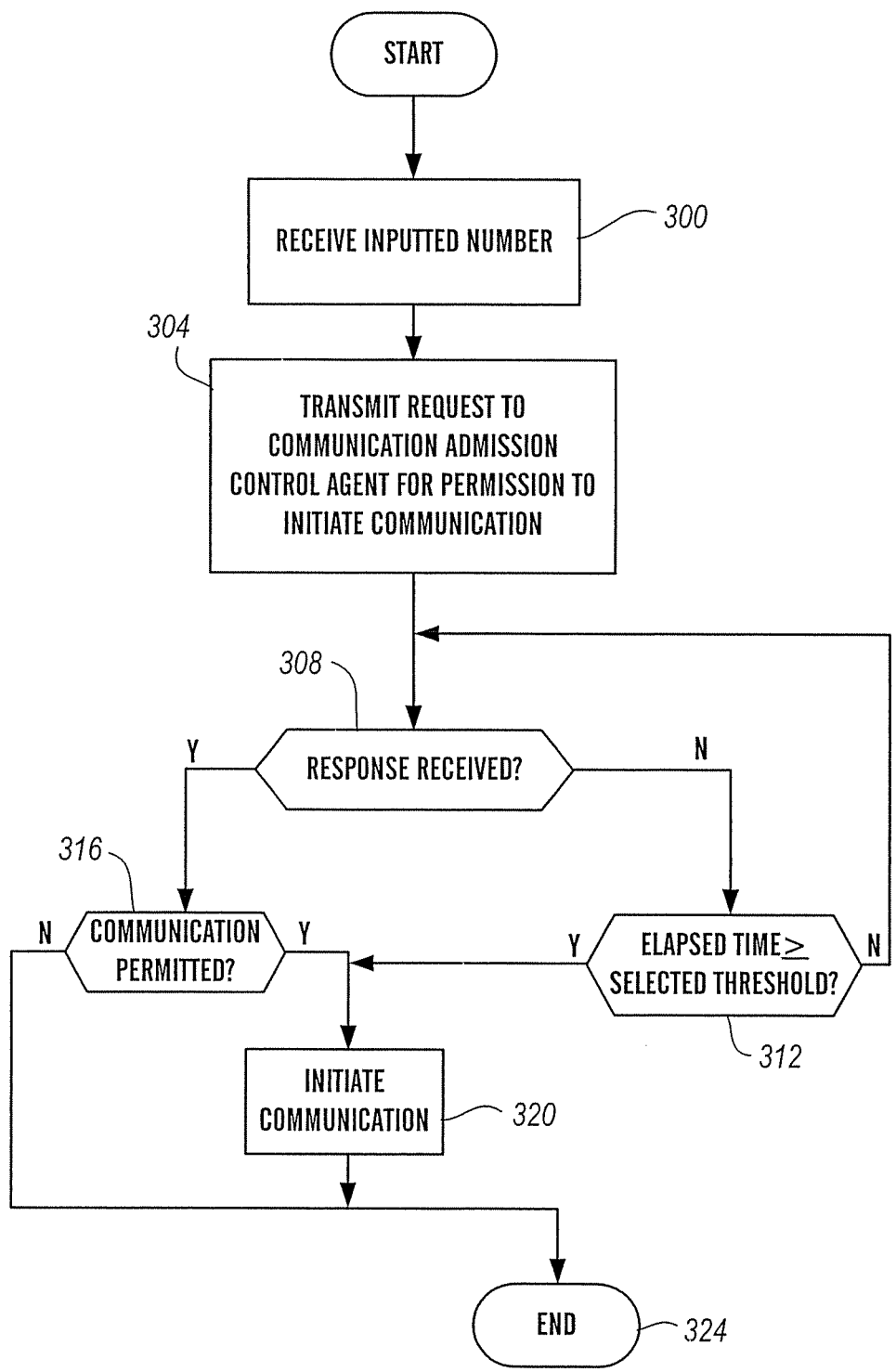
FIG. 3 is a flowchart showing an embodiment of the operation of the communication controller of FIG. 1.

FIGS. 2 and 3 depict an embodiment of the operations of the communication admission control agent 156 in the endpoint seeking to place a call and the communication controller 172, respectively. As can be seen from these figures, the call admission control functionality is decentralized to the endpoints compared to the conventional approach of centralizing call admission control functions in the call admission controller of the switch or media server.

Referring to FIG. 2, the agent 156 in step 200 detects that a user is attempting to initiate a contact. For example, this can be detected by detecting an off-hook state of the telephone, receiving an inputted series of signals such as would be associated with a telephone number or IP address.

The agent 156 in response to the detection can perform one or more of the statistic collection steps 204, 208, and 212, depending on the implementation.

In step 204, the agent 156 in the contact-initiating endpoint sends test packets to the switch or server and/or to one or more of the destination endpoints to assess available bandwidth. For example, the initiating endpoint could send a test Resv message to the destination endpoint to attempt to set up a dummy or test reservation. If the reservation cannot be set up, the agent 156 would conclude that insufficient bandwidth is available for the contact to be placed. The contents of the Resv message would be based on the parameters required by the anticipated contact. Alternatively, test RTP/RTCP packets can be sent between the two endpoints to measure one or more of the bandwidth information noted above, such as jitter, packet delay, and packet loss. The packets would have a dummy payload and the packet headers would include information such as time stamps. The format of the test packets is set forth in RFC 1889. In either of the two previous examples, a marker bit or flag would be included in the exchanged packets to notify the receiving endpoint that the packet is associated with an available bandwidth test. The details to implement either of these examples will be readily appreciated by one of ordinary skill in the art who is associated with the RSVP and/or RTP/RTCP protocols. The two examples can be performed simultaneously using the same set of test packets. Other protocols may also be used for statistic collection. As will be appreciated, a proprietary protocol can also be used to perform statistic collection by transmitting packets between two or more endpoints. These techniques can measure currently difficult-to-measure parameters such as echo.

In step 208, the agent 156 in the contact-initiating endpoint collects bandwidth information from intermediate functional elements, entities or components (e.g., routers and one or more of their associated interfaces) in the communication path. This statistic collection can be done using any suitable protocol. For example, the collection can be done using pinging as defined in the Internet Control Message Protocol or ICMP. In another approach, the bandwidth information can be collected using the Simple Network Management Protocol or SNMP. To substantially minimize bandwidth utilization, the statistic collection is generally stopped when enough information is collected to assess available bandwidth for the anticipated contact. While some bandwidth will be utilized by numerous endpoints simultaneously or near simultaneously collecting bandwidth information, the utilized bandwidth is considered to be insignificant when compared to the amount of bandwidth consumed by unrestricted or uncontrolled call placement.

In step 212, the agent 156 in the contact-initiating endpoint queries polls the switch or server 128 (which is the nearest gateway for the agent 156) or one or more other switches or servers acting as a monitor or otherwise located in a different network for relevant bandwidth information stored in their respective database 176. As will be appreciated, some or all of the bandwidth information gathered in steps 204 and 208 by the agents 156 in the various endpoints are forwarded to the switch or server for updating the database 176. Depending on the database rules or policies, this bandwidth information is retained in the database for a selected period of time. In one configuration, agents continue to collect bandwidth information after a contact is effected by the corresponding endpoint (s) until the contact is terminated and forwards the collected bandwidth information to the switch or server for database updating. In this manner, the endpoints act as network nodes, and any contact initiating endpoint may be able to obtain, nonintrusively, current information about bandwidth utilization on all or part of the communication path to the destination endpoint. In one configuration, steps 204 and 208 are not performed to avoid unnecessary use of bandwidth if relevant bandwidth information, as defined by the user or network administrators, is already contained in the database 176.

After the bandwidth information is collected by performing one or more of steps 204, 208, and 212, the agent 156 in the contact-initiating endpoint determines in step 216 whether the collected bandwidth information is within user-defined thresholds used to define a contact of acceptable quality. For example, the user can configure a packet loss to 5%, the packet round trip time to 150 milliseconds, and the jitter to 80 milliseconds. When the packet loss, round trip time, and/or jitter buffer delay exceeds the corresponding threshold, the bandwidth information is not within the user defined thresholds. The user can modify these and other thresholds to suit his or her personal taste. As will be appreciated, some users are more tolerable of lower call quality than others.

When the collected bandwidth information is within user-defined thresholds, the agent 156 in step 220 forwards a message to the controller 172 indicating that the contact can be connected. When the collected bandwidth information is not within user-defined thresholds, the agent 156 in step 224 notifies the user that the contact will not be connected and the reason(s) for the nonconnection. The user can then reconfigure the thresholds and attempt to make the contact or wait until a later time to again attempt the contact. In one configuration, the user can override the agent and proceed with the contact such as by inputting an authorization code. This is particularly important in an emergency situation.

Alternatively, the agent 156 can warn the user of the probable low quality for the contact if connected and permit the user to decide whether or not he or she wishes to continue with making the contact.

Referring now to FIG. 3, the controller 172 in step 300 receives an inputted series of signals such as would be associated with a telephone number or IP address. In step 304, the controller sends a request to the agent 156 of the contact-initiating endpoint for permission to initiate the communication. In steps 308 and 312, the controller 172 waits for a response. If no response is received within a selected time, the controller 172 proceeds to step 320 discussed below. If a response is received timely, the controller 172 in step 316 determines whether or not the endpoint granted permission for the contact to be effected. If not, the controller 172 proceeds to step 324 and terminates operation with respect to the current transaction. If so, the controller 172 in step 320 initiates the contact and then proceeds to step 324. In one configuration when the agent 156 grants permission for the contact, the controller 172 effects the contact only when a second tier of criterion selected by network administration are satisfied. Such criterion can be one or more of the bandwidth information noted above and/or one of the prior art criterion set forth previously.

A number of variations and modifications of the invention can be used. It would be possible to provide for some features of the invention without providing others.

Figure 4:
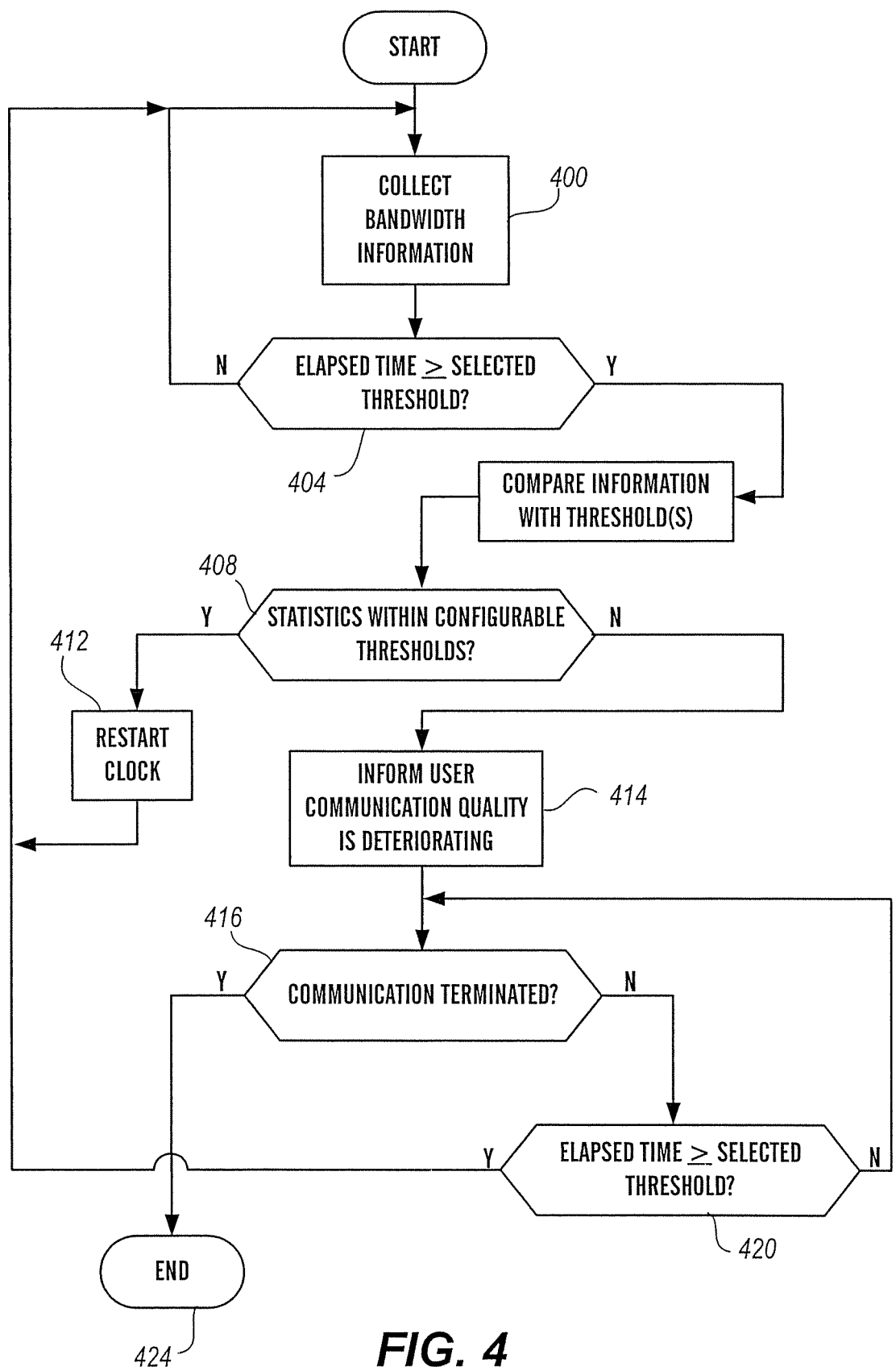
FIG. 4 is a flowchart showing yet another embodiment of the operation of the communication admission control agent.

For example in one alternative embodiment shown in FIG. 4, the agent 156 in an endpoint continues to collect bandwidth information during a contact or session and provides a warning to the user when the quality of the communication deteriorates below user-defined thresholds. This embodiment can be used with the network architecture of the present invention or a conventional network architecture, such as any of the architectures described previously. Referring to FIG. 4, after a contact is initiated the agent 156 in step 400 collects bandwidth information using any of the techniques noted previously. The agent 156 may forward these bandwidth information periodically to the switch or server for database updating. In step 404, the agent 156 determines if the elapsed time since clock reset has greater than or equal to a selected threshold. If not, the agent 156 repeats steps 400 and 404. If so, the agent 156, in step 408, compares at least some of the collected bandwidth information with the user configured thresholds. If the collected bandwidth information is within the thresholds, the clock is reset to zero in step 412 and the agent repeats steps 400 and 404. If the collected bandwidth information is not within user thresholds, the agent 156 informs the user in step 414 that the quality of the communication is deteriorating. In step 416, the agent 156 determines if the user has terminated the communication. If the communication was not terminated by the user in response to the warning, the agent 156 in step 420 determines if the elapsed time since the performance of step 412 equals or exceeds a selected threshold. If so, the agent 156 returns to and repeats steps 400 and 404. If not, the agent 156 repeats step 416. If the communication was terminated by the user in response to the warning, the agent 156 terminates operation in step 424.

Figure 5:
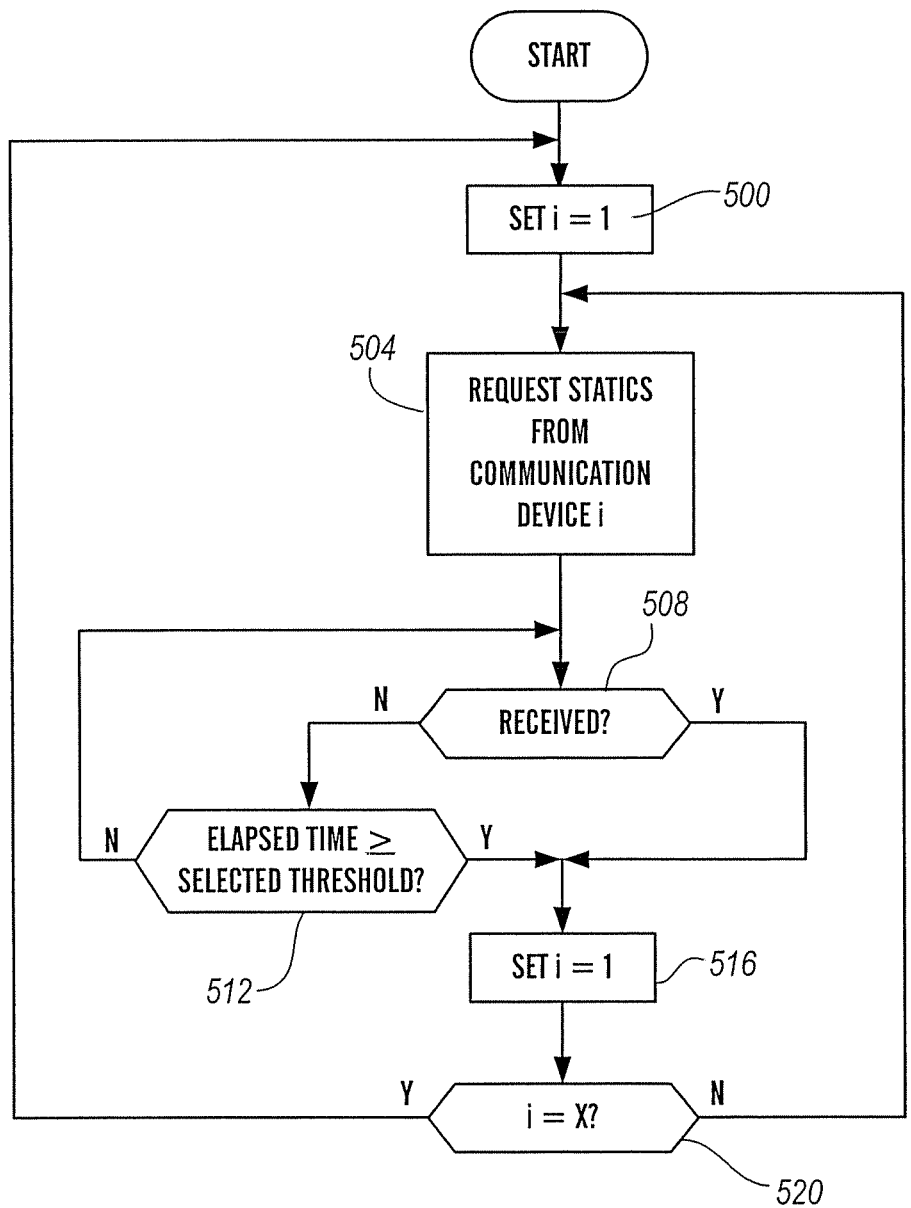
FIG. 5 is a flowchart showing yet another embodiment of the operation of the communication controller of FIG. 1.

In another alternative embodiment, the switch or server 128 uses one or more of the endpoints (whether or not involved in a session) as network nodes to collect periodically any of the bandwidth information noted above. This embodiment can be used with the network architecture of the present invention or a conventional network architecture, such as any of the architectures described previously. Referring to FIG. 5, a counter i is set to 1 in step 500. In step 504, bandwidth information is requested from communication device or endpoints. A plurality of the subscriber communication devices or endpoints in architecture 100 are assigned identifiers to permit the controller 172 to sequentially collect bandwidth information from each of the identified endpoints. In response to the request, the endpoint collects the bandwidth information using any of the techniques noted above. If the endpoint is involved in a communication, the controller 172 typically skips that endpoint and proceeds to the next endpoint as the bandwidth information from that communication is already being directed to the controller 172. In steps 508 and 512, the controller 172 determines if the requested bandwidth information has been received within a selected time threshold. If not, the controller 172 repeats steps 500 and 504. If so, the controller updates the database 176 and in step 516 increments the counter i by one. In step 520, the controller determines if i is equal to X, the highest identifier in the LAN. If so, the controller returns to step 500 and starts the above process over. If not, the controller returns to step 504.

In a further embodiment, agent 156 and/or controller 172 is/are configured as logic circuit(s) such as an Application Specific Integrated Circuit.

In yet another alternative embodiment, the division of responsibilities between the agent 156 and controller 172 is different from that discussed above.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for collecting bandwidth information, comprising:

providing a first switch and/or a first server in communication with a plurality of subscriber voice communication endpoints;

selecting, from the plurality of subscriber voice communication endpoints, a first subscriber voice communication endpoint;

requesting, by the first switch and/or first server, bandwidth information from the first subscriber voice communication endpoint;

the first subscriber voice communication endpoint requesting, from at least one first intermediate node, other than the first switch and/or first server, in at least one communication path between the first subscriber voice communication endpoint and another subscriber voice communication endpoint, a first subset of bandwidth information;

selecting, from the plurality of subscriber voice communication endpoints, a second subscriber voice communication endpoint;

requesting, by the first switch and/or first server, bandwidth information from the second subscriber voice communication endpoint;

the second subscriber voice communication endpoint requesting, from at least one second intermediate node, other than the first switch and/or first server, in at least one communication path between the second subscriber voice communication endpoint and another subscriber voice communication endpoint, a second subset of bandwidth information; and providing, by one or more of the first and second subscriber voice communication endpoints, at least one of the first subset of bandwidth information and the second subset of bandwidth information to the first switch and/or first server;

the first subscriber voice communication endpoint receiving from a first user associated with the first subscriber voice communication endpoint at least one signal associated with initiation of a requested voice communication from the first subscriber voice communication endpoint to at least one destination endpoint;

the first subscriber voice communication endpoint collecting bandwidth information used to determine an expected quality of the requested voice communication by obtaining bandwidth information from one or more entities in a communication path to the at least one destination endpoint;

the first subscriber voice communication endpoint comparing a portion of the collected bandwidth information with at least one threshold and dynamically determining, when the portion of the collected bandwidth information fails to satisfy the at least one threshold, whether to perform by the first subscriber communication endpoint one or more of:

(i) notifying the first user at the first subscriber voice communication endpoint of a likelihood of a low quality of the requested voice communication, and (ii) prohibiting initiation of the requested voice communication;

wherein the at least one signal comprises a telephone number or an address on a data network and wherein the first switch and/or first server requests permission to initiate the voice communication and further comprising:

when the at least some of the collected bandwidth information satisfies the at least one threshold, the first subscriber voice communication endpoint permitting initiation of the requested voice communication with the at least one destination endpoint;

wherein the first switch and/or first server performs the following steps:

receiving the at least one of a telephone number and address on a data network;

requesting permission from the first subscriber voice communication endpoint to initiate the requested voice communication; and receiving from the first subscriber voice communication endpoint a communication initiation message, wherein:

(i) when the communication initiation message indicates insufficient bandwidth is available for the requested voice communication, not connecting the first subscriber voice communication endpoint and the at least one destination endpoint, wherein the user is notified why the first subscriber voice communication endpoint is not to be connected with the at least one destination endpoint and wherein the user has the ability to override the first subscriber voice communication endpoint and proceed with the connection of the first subscriber voice communication endpoint and the at least one destination endpoint; and (ii) when the communication initiation message indicates sufficient bandwidth is available for the requested voice communication, connecting the first subscriber voice communication endpoint and the at least one destination endpoint.

2. The method of claim 1, further comprising:

selecting a third subscriber voice communication endpoint; and requesting bandwidth information from the third subscriber voice communication endpoint, wherein the third subscriber voice communication endpoint does not request, from at least one intermediate node in at least one communication path between the third subscriber voice communication endpoint and another subscriber voice communication endpoint, a third subset of bandwidth information, when the third subscriber voice communication endpoint is in use by a user.

3. The method of claim 1, wherein the bandwidth information comprises a plurality of the following: received real-time transport protocol packets, received real-time transport protocol octets, round trip time, jitter buffer delay, jitter, packet loss burst size, a number of out-of-order packets, an out-of-order distance, Reservation Protocol status, Internet Protocol Differentiated Service Code Point, available bandwidth, router buffer size, a number of dropped packets by a router, router bandwidth utilization, and router processor utilization, wherein the first subscriber voice communication endpoint performs call admission control for outgoing voice communications from the first subscriber voice communication endpoint, and wherein at least one bandwidth requirement for permitting the outgoing voice communication is user configurable.

4. The method of claim 1, wherein the at least one threshold is user configurable, wherein the first subscriber voice communication endpoint and at least one destination endpoint are one of an Internet Protocol hard phone, an Internet Protocol softphone, a telephone other than an Internet Protocol hard phone and softphone, and a personal digital assistant, and wherein the first subscriber voice communication endpoint is further operable to collect a third subset of bandwidth information while the first subscriber voice communication is connected, in a voice communication, with the at least one destination endpoint and inform the user when the third subset of bandwidth information is not within at least one threshold.

5. A non-transient computer readable medium comprising processor executable instructions operable to, when executed by a processor, perform the steps of claim 1.

6. A network, comprising:

a plurality of subscriber voice communication endpoints; and a first switch and/or a first server in communication with the plurality of subscriber voice communication endpoints, wherein the first switch and/or first server is operable to:

(a) select, from the plurality of subscriber voice communication endpoints, a first subscriber voice communication endpoint;

(b) request bandwidth information from the first subscriber voice communication endpoint;

(c) perform with the first subscriber voice communication endpoint at least one of the following sub-operations:

(i) sending at least one test packet to another subscriber voice communication endpoint to obtain a first subset of bandwidth information; and (ii) requesting, from at least one intermediate node, other than the first switch and/or first server, in at least one communication path between the first subscriber voice communication endpoint and another subscriber voice communication endpoint, a second subset of bandwidth information; and (d) selecting, from the plurality of subscriber voice communication endpoints, a second subscriber voice communication endpoint; and (e) repeating steps (b) and (c) with respect to the second subscriber voice communication endpoint, wherein the first subscriber voice communication endpoint is operable to perform the following sub-operations:

(a1) receive from a first user associated with the first subscriber voice communication endpoint at least one signal associated with initiation of a requested voice communication from the first subscriber voice communication endpoint to at least one destination voice communication endpoint;

(b1) collect bandwidth information used to determine an expected quality of the requested voice communication by obtaining bandwidth information from one or more entities, other than the first switch and/or first server, in a communication path to the at least one destination voice communication endpoint; and (c1) compare a portion of the collected bandwidth information with at least one threshold and dynamically determine, when the portion of the collected bandwidth information fails to satisfy the at least one threshold, whether to perform one or more of:

(i) notifying the first user at the first subscriber voice communication endpoint of a likelihood of a low quality of the requested voice communication, and (ii) prohibiting initiation of the requested voice communication;

wherein the at least one signal comprises a telephone number or an address on a data network and wherein the first switch and/or first server requests permission to initiate the requested voice communication and further comprising:

when the at least some of the collected bandwidth information satisfies the at least one threshold, the first subscriber voice communication endpoint permitting initiation of the requested voice communication between the first subscriber voice communication endpoint and the at least one destination voice communication endpoint;

wherein the first switch and/or first server performs the following sub-operations:

receive the at least one of a telephone number and address on a data network;

requesting permission from the first subscriber voice communication endpoint to initiate the requested voice communication; and receiving from the first subscriber voice communication endpoint a communication initiation message, wherein:

(i) when the communication initiation message indicates insufficient bandwidth is available for the requested voice communication, not connecting the first subscriber voice communication endpoint and the at least one destination voice communication endpoint, wherein the user is notified why the first subscriber voice communication endpoint is not to be connected with the at least one destination endpoint and wherein the user has the ability to override the first subscriber voice communication endpoint and proceed with the connection of the first subscriber voice communication endpoint and the at least one destination endpoint; and (ii) when the communication initiation message indicates sufficient bandwidth is available for the requested voice communication, connecting the first subscriber voice communication endpoint and the at least one destination voice communication endpoint.

7. The network of claim 6, wherein the first switch and/or first server are further operable to:

(f) select a third subscriber voice communication endpoint; and (g) request bandwidth information from the third subscriber voice communication endpoint, wherein the third subscriber voice communication endpoint does not perform step (c) with respect to the third subscriber voice communication endpoint, when the third subscriber voice communication endpoint is in use by a user.

8. The network of claim 6, wherein the bandwidth information comprises a plurality of the following: received real-time transport protocol packets, received real-time transport protocol octets, round trip time, jitter buffer delay, jitter, packet loss burst size, a number of out-of-order packets, an out-of-order distance, Reservation Protocol status, Internet Protocol Differentiated Service Code Point, available bandwidth, router buffer size, a number of dropped packets by a router, router bandwidth utilization, and router processor utilization, wherein the first subscriber voice communication endpoint performs call admission control for outgoing voice communications from the first subscriber voice communication endpoint, and wherein at least one bandwidth requirement for permitting the outgoing voice communication is user configurable.

9. The network of claim 6, wherein sub-operation (ii) is performed.

10. The network of claim 6, wherein the at least one threshold is user configurable, wherein the first subscriber voice communication endpoint and the at least one destination voice communication endpoint are one of an Internet Protocol hard phone, an Internet Protocol softphone, a telephone other than an Internet Protocol hard phone and softphone, and a personal digital assistant, and wherein the first subscriber voice communication endpoint is further operable to collect a third subset of bandwidth information while the first subscriber voice communication is connected, in a voice communication, with the at least one destination voice communication endpoint and inform the user when the third subset of bandwidth information is not within at least one threshold.

11. The network of claim 6, wherein sub-operation (c1)(i) is performed, further comprising the further sub-operations:

receiving, at the first subscriber voice communication endpoint, an input from the first user that the voice communication should continue with the low quality of the voice communication; and thereafter, repeating, by the first subscriber voice communication endpoint, sub-operations (b) and (c).

12. The network of claim 11, further comprising the sub-operations:

determining that newly collected bandwidth information fails to satisfy a second threshold defined by the first user, wherein the second threshold is different from the at least one threshold; and repeating, by the first subscriber voice communication endpoint, sub-operations (a1), (b1), and (c1).

13. A method for collecting bandwidth information, comprising:

providing a first switch and/or a first server in communication with a plurality of subscriber voice communication endpoints;

selecting, from the plurality of subscriber voice communication endpoints, a first subscriber voice communication endpoint;

requesting, by the first switch and/or first server, bandwidth information from the first subscriber voice communication endpoint;

the first subscriber voice communication endpoint requesting, from at least one first intermediate node, other than the first switch and/or first server, in at least one communication path between the first subscriber voice communication endpoint and another subscriber voice communication endpoint, a first subset of bandwidth information;

selecting, from the plurality of subscriber voice communication endpoints, a second subscriber voice communication endpoint;

requesting, by the first switch and/or first server, bandwidth information from the second subscriber voice communication endpoint;

the second subscriber voice communication endpoint requesting, from at least one second intermediate node, other than the first switch and/or first server, in at least one communication path between the second subscriber voice communication endpoint and another subscriber voice communication endpoint, a second subset of bandwidth information; and providing, by one or more of the first and second subscriber voice communication endpoints, at least one of the first subset of bandwidth information and the second subset of bandwidth information to the first switch and/or first server;

wherein the bandwidth information comprises: received real-time transport protocol packets, received real-time transport protocol octets, round trip time, jitter buffer delay, jitter, packet loss burst size, a number of out-of-order packets, an out-of-order distance, Reservation Protocol status, Internet Protocol Differentiated Service Code Point, available bandwidth, router buffer size, a number of dropped packets by a router, router bandwidth utilization, and router processor utilization, wherein the first subscriber voice communication endpoint performs call admission control for outgoing voice communications from the first subscriber voice communication endpoint, and wherein at least one bandwidth requirement for permitting the outgoing voice communication is user configurable.

* * * * *

UNITED STATES PATENT AND TRADEMARK OFFICE
CERTIFICATE OF CORRECTION

| | |
|---|---|
| PATENT NO. | : 8,593,959 B2 |
| APPLICATION NO. | : 11/672183 |
| DATED | : November 26, 2013 |
| INVENTOR(S) | : Neil Hepworth et al. |

It is certified that error appears in the above-identified patent and that said Letters Patent is hereby corrected as shown below:

In the Claims:

Column 11, line 22, after "the" please insert --requested--.

Signed and Sealed this
First Day of July, 2014

Michelle K. Lee
*Deputy Director of the United States Patent and Trademark Office*